Sept. 15, 1964    R. POLK, JR    3,148,764
FRUIT CLAMPING MECHANISM
Original Filed April 23, 1958    4 Sheets-Sheet 1
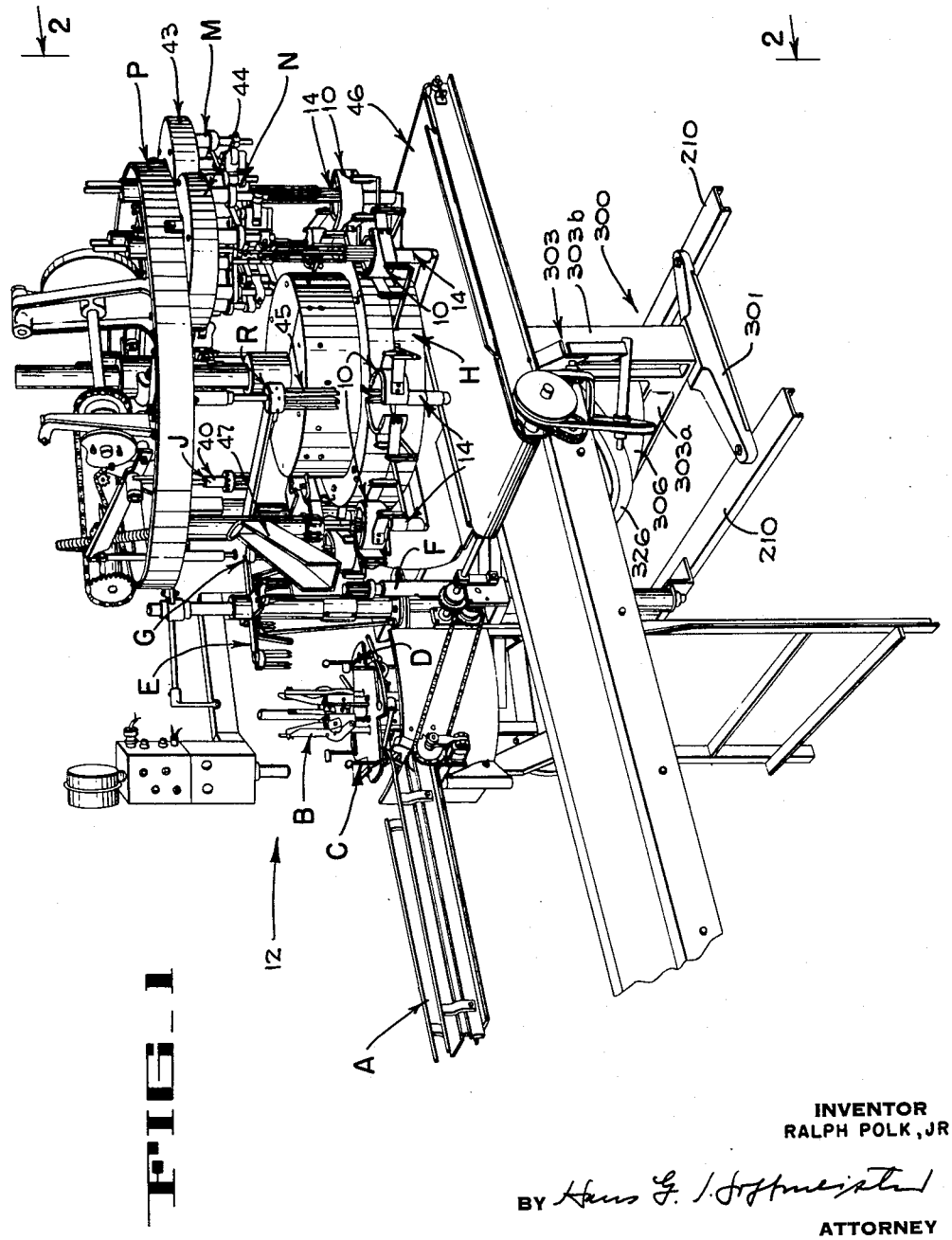
FIG_1
INVENTOR
RALPH POLK, JR.
BY Hans G. Hoffmeister
ATTORNEY Sept. 15, 1964  R. POLK, JR  3,148,764
FRUIT CLAMPING MECHANISM
Original Filed April 23, 1958  4 Sheets-Sheet 2
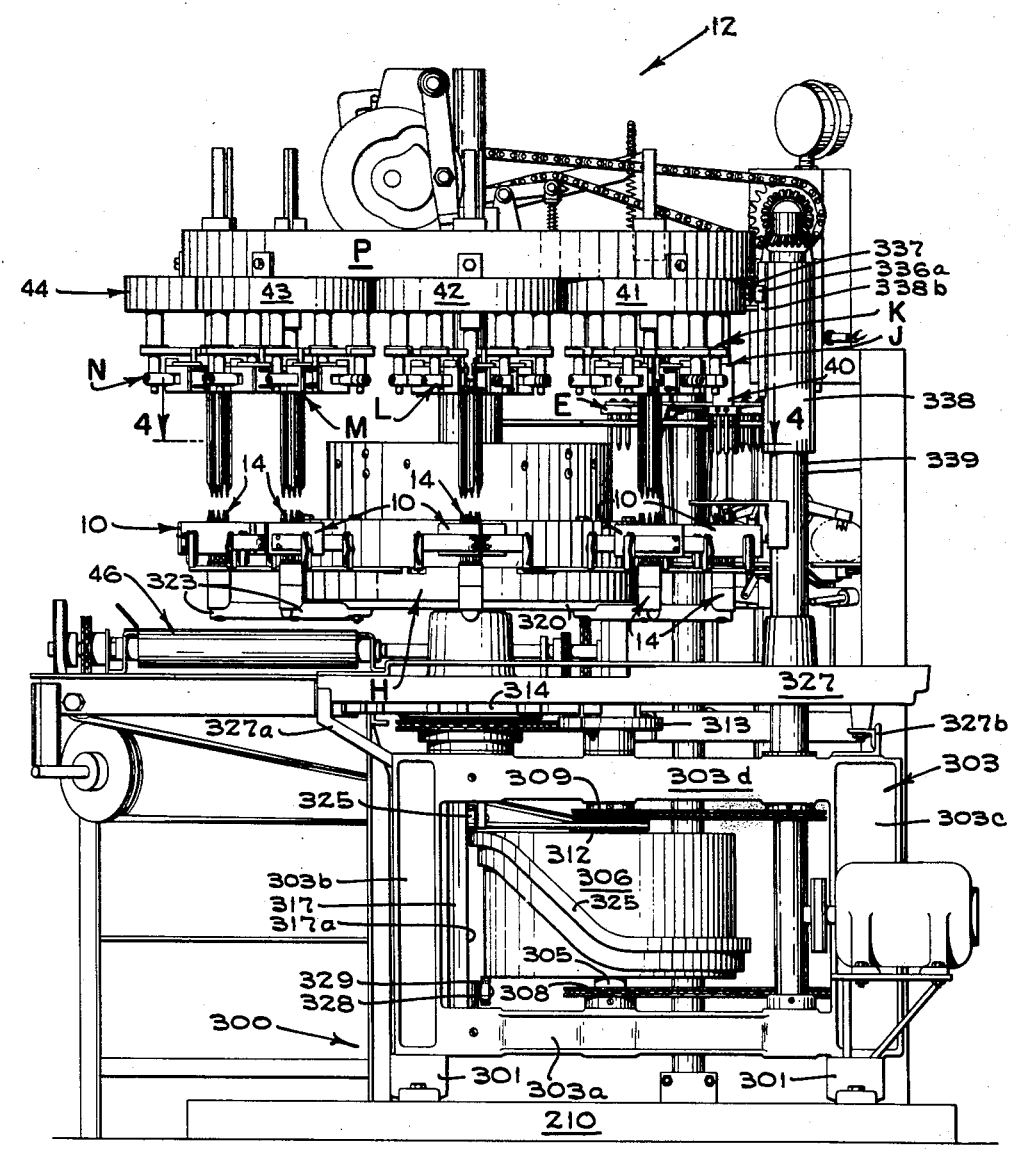
FIG_2
INVENTOR
RALPH POLK, JR.
BY
ATTORNEY

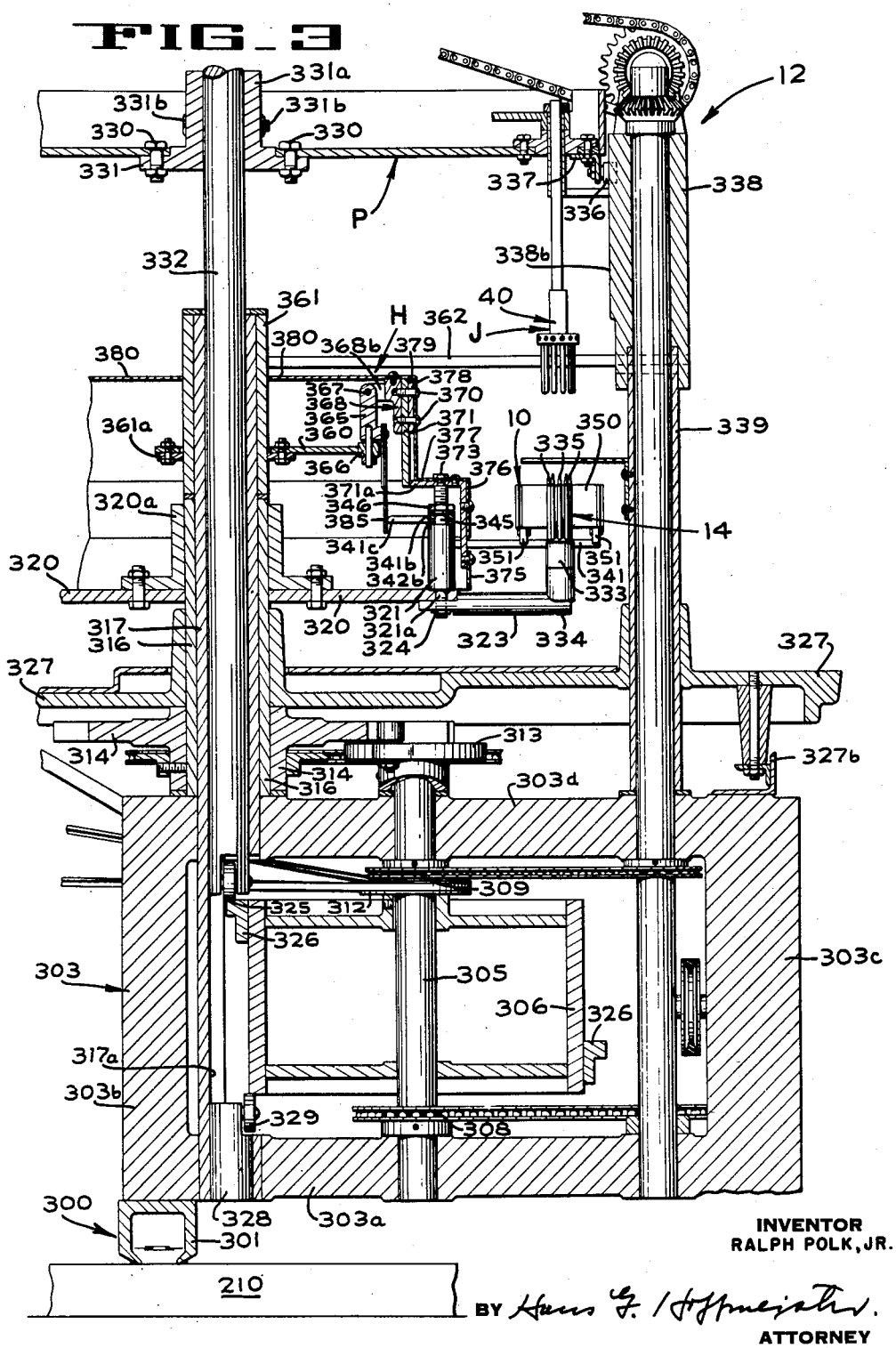

Sept. 15, 1964  R. POLK, JR  3,148,764
FRUIT CLAMPING MECHANISM
Original Filed April 23, 1958  4 Sheets-Sheet 4
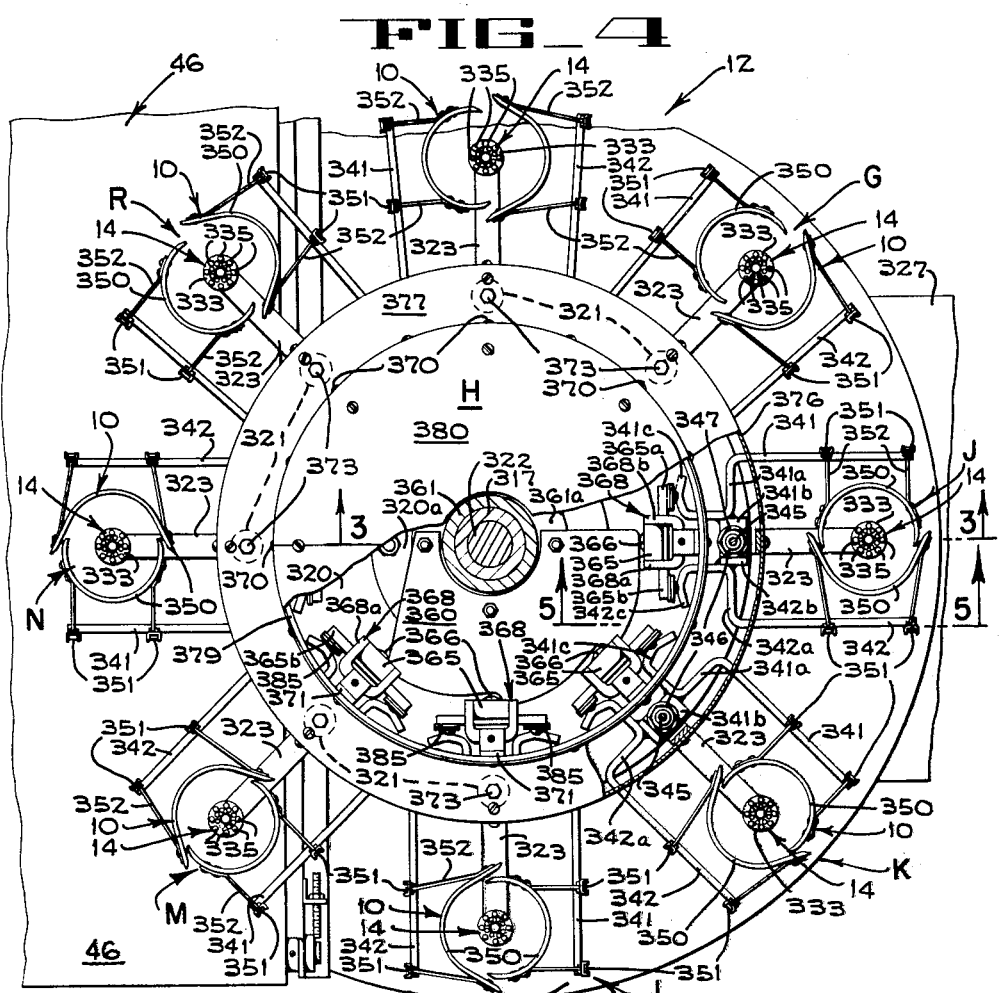
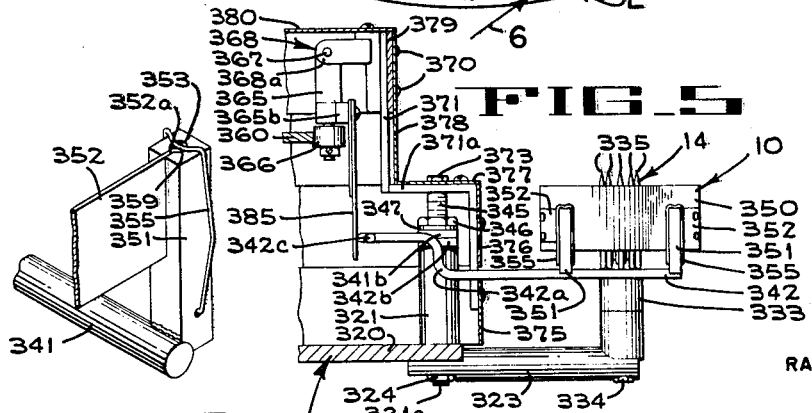
INVENTOR
RALPH POLK, JR.
BY Hans G. Hoffmeister
ATTORNEY ated Sept. 15, 1964

3,148,764
FRUIT CLAMPING MECHANISM
Ralph Polk, Jr., Box 3208, Tampa, Fla.
Original application Apr. 23, 1958, Ser. No. 730,298, now Patent No. 3,030,990, dated Apr. 24, 1962. Divided and this application July 26, 1961, Ser. No. 126,931
5 Claims. (Cl. 198—210)

The present application is a division of my copending application, Serial No. 730,298, filed April 23, 1958, now Patent No. 3,030,990.

This invention pertains to the processing of fruit and more particularly relates to a clamping mechanism for surrounding a fruit and maintaining the desired orientation of segments of citrus fruit, such as grapefruit, during a sectionizing operation.

During one phase of the operation of mechanically sectionizing citrus fruit, such as grapefruit, the grapefruit is intermittently advanced between certain stations where operations are performed on the peeled grapefruit which progressively separate the several fruit segments from each other. The grapefruit segments must be lightly held together during movement of the fruit between the stations to prevent the segments from changing positions during this indexing movement, which position change would adversely affect certain operations performed on the grapefruit. Accordingly, it is an object of the present invention to provide a clamping mechanism for a citrus fruit sectionizing machine.

In removing segments from a grapefruit, blades are usually moved axially into the fruit and then radially outwardly along the membranes. When available clamping mechanisms are used to hold the grapefruit in a compact form during this operation, the clamp members interfered with the operation of the blades. It is therefore, another object of the present invention to provide a clamping mechanism arranged to yield while the fruit is at the stations to permit the sectionizing blades to move radially outwardly as the blades reach the periphery of the fruit.

Since the grapefruit sectionizing machine with which the clamping mechanism of the present invention is associated indexes the grapefruit between several stations at each of which the sectionizing operation is performed on different segments of the grapefruit, a predetermined orientation of the segments while at the stations and when moving between the stations must be maintained. Therefore, another object of the invention is to provide a clamping mechanism arranged to lightly grip a grapefruit when the grapefruit is being moved between stations and to relax its grip upon the grapefruit when the grapefruit is at the processing stations.

Another object is to provide a fruit clamping mechanism arranged to encompass a grapefruit at a processing station and to be actuated into gentle gripping engagement with the grapefruit as it is advanced between stations.

These and other objects and advantages will become apparent from the following description and the accompanying drawings, in which:

FIG. 1 is a perspective of a grapefruit sectionizing machine having the fruit clamping mechanism of the present invention associated therewith, certain parts being broken away.

FIG. 2 is an elevation looking in the direction of arrows 2—2 of FIG. 1.

FIG. 3 is a fragmentary vertical section taken substantially along line 3—3 of FIG. 4.

FIG. 4 is an enlarged fragmentary horizontal section taken along lines 4—4 of FIG. 2 with parts broken away.

FIG. 5 is an enlarged vertical section taken along lines 5—5 of FIG. 4.

FIG. 6 is an enlarged perspective taken looking in the direction of arrow 6 in FIG. 4.

The fruit clamping mechanisms 10 (FIG. 1) of the present invention are part of a grapefruit sectionizer 12 which advances peeled and treated grapefruit from a supply conveyor A to a position within reach of an operator, who stands in front of a feed turret B and places each grapefruit on the feed turret at station C of the turret. The feed turret B is intermittently indexed through 90° angular increments in a clockwise direction (FIG. 4) to bring each grapefruit to a transfer station D (FIG. 1) where the grapefruit is automatically transferred from the feed turret B to a transfer turret E which is also arranged to be intermittently indexed in 90° increments in synchronism with the movements of feed turret B, but in a counterclockwise direction. The grapefruit is then moved to a seed disturbing station F and then to a second transfer station G where it is deposited in one of a plurality of fruit carriers 14, which is disposed within one of the fruit clamping mechanisms 10 of the present invention, and is mounted on a main turret H (FIG. 1). The main turret H is arranged to be intermittently indexed through 45° angular increments in a clockwise direction to move the grapefruit successively into operative association with a second seed disturber unit 40 (FIG. 2) and with first, second, third and fourth heads 41, 42, 43, and 44, respectively, which are carried by and project downwardly from a vertically movable tool carrier on top plate P. The heads 41, 42, 43 and 44 perform their operations at stations K, L, M and N (FIG. 4), respectively. Each head has a plurality of blades arranged to be moved down into a grapefruit to separate pie-shaped meat segments from the grapefruit core and the radial membranes. The sectionized grapefruit with the separated segments disposed around the core is then brought under a spinner or stripper unit 45, at station R, that wraps the radial membranes around the stationary core, causing any remaining bond between the membranes and the segments to be completely broken and causing the segments to drop onto a discharge conveyor 46. The core is then moved to a position under a core stripping mechanism 47 which moves the core from the fruit carrier.

Since the grapefruit sectionizer 12 has been completely disclosed in the above mentioned parent application, only those parts pertinent to the mechanism of the present invention will be described in detail. If further information is desired concerning the construction and operation of other parts of the grapefruit sectionizer 12, reference may be had to the parent application.

The main turret H (FIGS. 1 and 2), which supports a plurality of the fruit clamping mechanisms 10, includes a base 300 comprising two spaced base channels 210, two spaced bars 301 which extend between the channels 210 and are bolted thereto, and a vertical frame 303 which is fixed to the bars 301 and projects upwardly therefrom. The frame 303 (FIG. 2) comprises a bottom member 303a, two side members 303b and 303c and a top member 303d. A vertical shaft 305, on which a barrel cam 306 is keyed is journalled for rotation in the bottom and top members 303a and 303d. A drive sprocket 308 is keyed to shaft 305 between the lower end of the barrel cam and the bottom member 303a and a driven sprocket 309 is secured to the shaft 305 between the top of the barrel cam and the top member 303d of the support frame 303. A pulley 312 and a driver 313 of a Geneva drive mechanism are also secured to the shaft 305. The Geneva driver 313 is arranged to periodically engage and rotate a Geneva gear 314 that is keyed to a tubular shaft 316 (FIG. 3) which is rotatably journalled around a guide shaft or tube 317. Near its lower end, the second shaft 317 is fixed, as by setscrews in, both the bottom frame member 303a and the top frame member 303d. A turret plate 320 is provided with a hub 320a clamped around the tubular shaft 316 for rotation therewith. A vertically reciprocable shaft 322, which is slidable in the tubular shaft 317, carries at its lower end a roller 325 which rides along the upper surface of a cam track 326 formed on the periphery of the barrel cam 306. The lower end of the vertical shaft 322 is also slidably journalled on the inner wall of the fixed guide tube 317 which has a cut-away portion 317a into which the cam track 326 projects. A block 328 is secured in the lower portion of tube 317 and carries a roller 329 which is disposed in supporting contact with the lower surface of barrel cam 306. A table 327 is disposed immediately below the turret plate 320, being supported at opposite marginal edges by brackets 327a and 327b secured to the base frame member 303d.

The before-mentioned tool carrier or top plate P is secured by bolts 330 to a circular flange 331 that has a hub 331a clamped to the vertically movable shaft 322 by a bolt 331b. Therefore, when the shaft 322 is reciprocated in a vertical direction, as the roller 325 rides along cam track 326, the top plate P is also reciprocated vertically. The top plate is guided during its vertical reciprocating movement by two spaced rollers 336 and 336a (FIGS. 2 and 3) which are mounted on a bracket 337 secured to the top plate. The rollers ride along oppositely facing vertical, flat wall portions formed on an extended portion 338b of a tubular bearing member 338 that is supported from the base frame 303 by a tublar support member 339.

The turret plate 320 (FIGS. 4 and 5) has eight upstanding posts 321 mounted in equally spaced relation around its outer periphery. Directly below each post 321 a support arm 323 extends radially outwardly from the under surface of the plate 320. Each post 321 and its associated support arm 323 are held in fixed position by a nut 324 (FIG. 5) that is threaded on a stud 321a projecting downwardly from the post through suitable openings in the plate and in the support arm. One of the fruit carrier units 14 is mounted on the outer end of each support arm, said unit comprising an upstanding prong holder 333 which is secured by a capscrew 334 to the outer end of the arm 323. Two concentric circles of prongs 335 (FIG. 4) are fixed in and project upwardly from the prong holder 333.

One of the fruit clamping mechanisms 10 of the present invention is associated with each fruit carrier 14. Each clamping mechanism comprises two arms 341 and 342 (FIG. 4) which are disposed on opposite sides of the prongs 335. The arm 341 has a radially inner offset portion 341a carrying an apertured tab 341b that is rotatably journalled on a threaded reduced diameter projection 345 (FIG. 5) of the associated upstanding post 321. Similarly the arm 342 has an offset portion 342a carrying an apertured tab 342b rotatably disposed around the reduced diameter projection 345. A nut 346 is threaded on the projection 345 and is arranged to press a washer 347 against the superposed tabs 341b and 342b. The arms 341 and 342 have inner end portions 341c and 342c, respectively (FIG. 4), that are bent to a position generally normal to a line extending radially from the axis of hub 320a.

A generally semi-cylindrical band 350 is mounted on the two spaced posts 351 that project upwardly from the outer end portion of each of the arms 341 and 342. Each band 350 is made of yieldable material, such as rubber, and has a spring steel strap 352 riveted to each end. Each of the straps 352 (FIG. 6) has a curled inner end 352a which is slipped into a keyhole slot 353 extending downwardly in the associated post 351. A spring clip 355 is pivotally mounted at its lower end in each post 351 and has a pointer intermediate portion 359 arranged to extend into the top portion of the keyhole slot to resiliently retain the spring clip 355 in place.

The clamp arms 341 and 342 are urged toward each other to grip a fruit on the prong carrier by means of a cam plate 360 (FIGS. 3 and 4) which is secured to a flange 361a which is welded on a tube 361. The tube 361 is disposed around the fixed shaft 317 and is held against rotation by a flat bar 362 that is secured to a flange 338a of the tubular bearing member 338. The cam plate 360 is arranged to engage a follower roller 366 (FIG. 5) carried on the lower end of a lever 365. At its upper end the lever 365 is pivotally mounted on a pin 367 between two arms 368a and 368b (FIG. 4) of a bracket 368 that is secured by capscrews 370 (FIG. 5) to the upper end of a fixed mounting member 371. The mounting member 371 is held in fixed position by means of a capscrew 373 which passes through an opening in a horizontal portion 371a of the member 371 and is threaded in the upper end of the reduced diameter projection 345 of post 321. It will be evident that, since there are eight posts 321 there will be eight fixed mounting members 371 spaced around the periphery of the turret. These eight mounting members provide support for annular dust shields 375, 376, 377, 378, a rigid band 379, and a cover plate 380, all of said memebrs being connected to the fixed mounting members by capscrews or the like.

The cam actuated lever 365 has two laterally projecting arms 365a and 365b (FIG. 4) adjacent its lower end. Each of these arms carries a downwardly projecting leaf spring 385 which is disposed opposite one of the bent inner arms 341c or 342c of the clamp arms 341 and 342.

In the operation of the fruit clamping mechanism 10 (FIG. 4), each follower roller 366 comes into contact with the outer peripheral camming edge of the cam plate 360 just after the associated fruit carrier 14 has completed its movement from transfer station G to the second seed disturber station, indicated by reference letter J. The camming surface is so designated that the fruit clamping members 10 are moved toward a position around the grapefruit in the fruit carrier but are not urged into gripping engagement with the grapefruit at this seed disturber station. However, when the next indexing movement of the turret begins the cam immediately pivots lever 365 causing the clamping bands to grip the grapefruit. When the fruit reaches station K under the first head 41 (FIG. 2), the roller follower 366 (FIG. 13) moves into a recess in the caming surface, causing the clamping bands to relax their grip on the grapefruit while the first head cuts into the grapefruit. When the fruit carrier 14 is moved to station L under the second head 42, the bands are moved to gripping engagement with the grapefruit and then relaxed when station L is reached. Similarly, the bands are tightened around the grapefruit during movement from station L to M, and released at station M under the third head 43. Since the clamping bands are relaxed during the operation of the heads, they will yield and move outwardly when contacted by the blades of the sectionizing heads as the blades move radially outwardly through the grapefruit. The light clamping pressure on the grapefruit as it is moved from station to station keeps the grapefruit in a compact form and in a predetermined orientation and prevents shifting of the grapefruit sections. As explained in the parent application, at station M under the third sectionizing head the blades of the head are not moved all the way out through the grapefruit. Accordingly, the bands will not be spread by the blades and, no inward movement of the bands is necessary between stations M and N. At station N the blades move the bands to an outer spread position. Since there is no further need for keeping the grapefruit in compact form, the clamping bands are not moved inwardly again until the seed disturber station J is again reached by the fruit carrier.

From the foregoing description, it is apparent that the fruit clamping mechanism of the present invention is arranged to lightly clamp the grapefruit segments together as the grapefruit is moved between processing stations to maintain the grapefruit in compact form and to prevent shifting of the grapefruit sections. When the grapefruit is disposed at the processing stations, the gripping pressure is relieved so that the grapefruit segments may be moved radially outward but be held from discharge from the carrier by the resilient nature of certain parts of the clamping mechanism.

Having thus described my invention, what I claim as new and desire to protect by Letters Patent is:

1. In a grapefruit sectionizing apparatus of the type wherein fruit sectionizing tools are moved axially through the fruit at various processing stations to divide the fruit into a plurality of sections the combination of a fruit carrier, an intermittently rotating turret supporting said fruit carrier, means for indexing said turret to move said carrier between spaced processing stations, a pair of generally semi-cylindrical bands of yieldable material, means pivotally connecting said bands to said turret for movement toward and away from a fruit on said carrier, and means for actuating said connecting means into clamping engagement with the fruit when said carrier is being moved between several of said stations to hold the partially sectionized fruit in compact form and to maintain the orientation of the fruit in the machine and relieving the clamping pressure against the fruit when said carrier is positioned at said several processing stations.

2. In an apparatus for sectionizing grapefruit the combination of means for supporting a grapefruit, a pair of generally semi-cylindrical bands encompassing said support means, carrier means mounting said support means and said bands for movement between spaced processing stations, fixed cam means disposed adjacent said bands and having a stepped camming surface, and resilient means operatively connected between said bands and said cam means, said stepped camming surface being arranged upon movement of said carrier means between several of said stations to urge said bands into resilient clamping engagement against the grapefruit and upon arriving at each of said several stations to relieve the clamping pressure exerted by said bands against the grapefruit.

3. In an apparatus for sectionizing grapefruit the combination of a fruit carrier, an intermittently rotating turret supporting said fruit carrier and arranged to move said carrier between spaced processing stations, a pair of arms pivotally mounted on said turret, a pair of generally semi-cylindrical bands of yieldable material disposed adjacent said arms, resilient means connecting one of said yieldable bands to one of said arms and connecting the other band to the other arm, a fixed cam positioned adjacent said arms, and resilient means operatively connected between said fixed cam and said arms and arranged upon movement of said fruit carrier between processing stations to urge said bands into resilient clamping engagement against the grapefruit.

4. In an apparatus for sectionizing grapefruit the combination of, a fruit carrier, an intermittently rotating turret supporting said fruit carrier and arranged to move said carrier between spaced processing stations, a pair of arms pivotally mounted on said turret, a pair of generally semi-cylindrical bands of yieldable material disposed adjacent said arms for encompassing the grapefruit, spaced resilient means connecting one of said yieldable bands to one of said arms, second spaced resilient means connecting the other yieldable band to the other of said arms, a fixed cam positioned adjacent said arms and having a stepped camming surface, and resilient means operatively connected between said fixed cam and said arms for urging said bands into clamping engagement against the grapefruit upon movement of said said fruit carrier between stations and for relieving the clamping engagement against the grapefruit upon arrival of the carrier at said station.

5. In a grapefruit sectionizing machine of the type wherein each fruit is supported in a predetermined position on a turret with its stem-blossom axis disposed in a generally vertical direction and the turret is periodically indexed in an angular direction to position the fruit at various stations directly below sectionizing tools that move axially through the fruit to divide the fruit into sections, fruit positioning apparatus comprising a clamping unit arranged to encircle the fruit and having portions movable relative to each other from a closed position gripping the fruit to an open position releasing the fruit, and means operable in timed relation to the indexing movements of the turret and operatively connected to the clamping unit for holding said portions in said open position when the fruit within the clamp is positioned at several of the processing stations and for resiliently moving said portions to closed position as the fruit is carried between said several stations in compact form.

References Cited in the file of this patent
UNITED STATES PATENTS

| | | |
|---|---|---|
| 2,087,809 | Nichols | July 20, 1937 |
| 2,342,131 | Erickson | Feb. 22, 1944 |
| 2,627,884 | Polk | Feb. 10, 1953 |
| 2,742,141 | Ouellette | Apr. 17, 1956 |